No. 623,226. Patented Apr. 18, 1899.
W. W. VADER & A. C. CROSS.
HITCHING DEVICE.
(Application filed Apr. 23, 1898.)
(No Model.) 2 Sheets—Sheet 1.
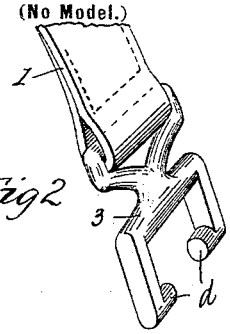
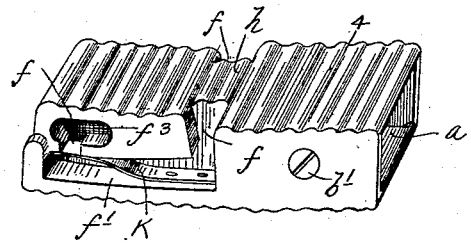
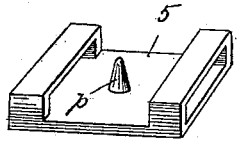
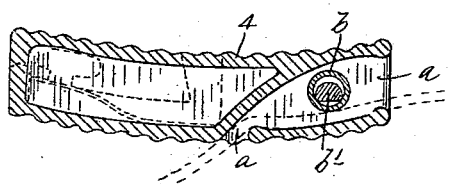
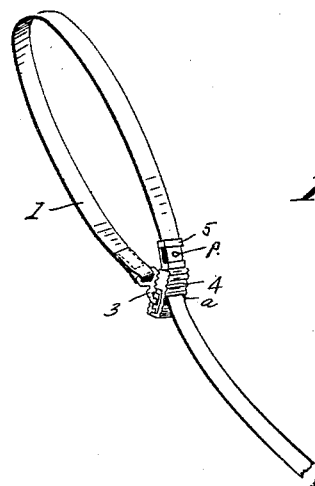
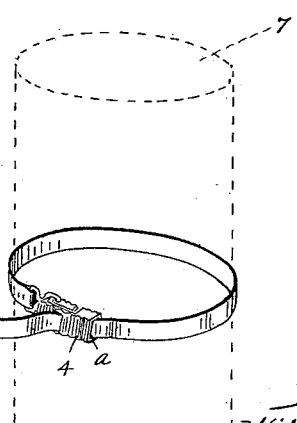
Witnesses
C. F. Kilgore
Harry Kilgore
Inventors
William W. Vader
Albert C. Cross
By their Attorney
Jas. F. Williamson No. 623,226. Patented Apr. 18, 1899.
W. W. VADER & A. C. CROSS.
HITCHING DEVICE.
(Application filed Apr. 23, 1898.)
(No Model.) 2 Sheets—Sheet 2.
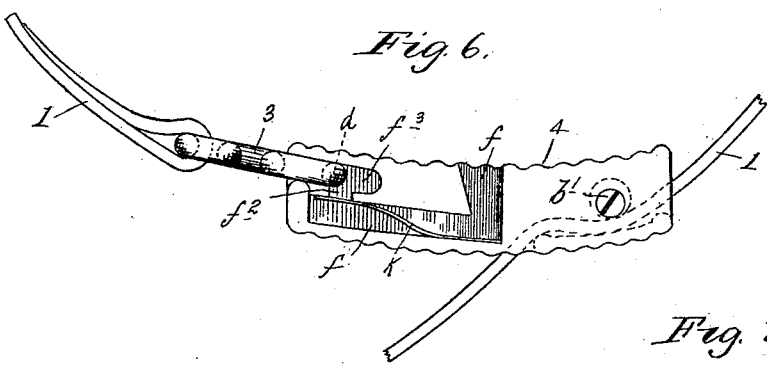
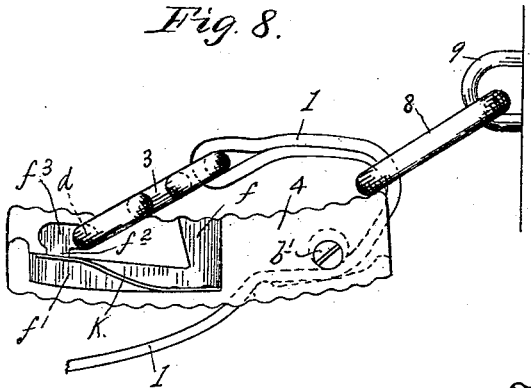
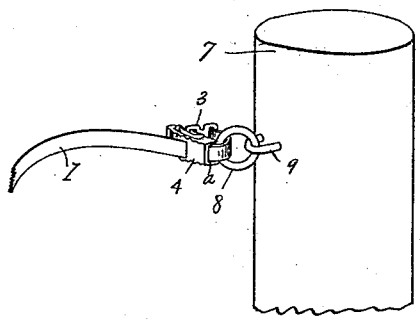
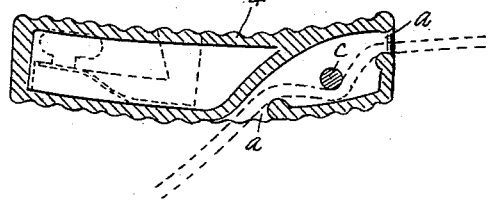
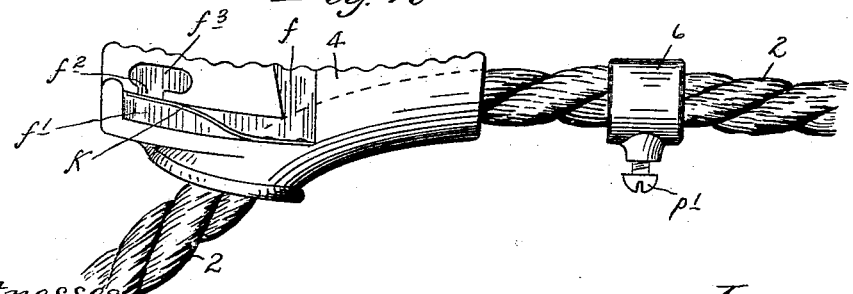
Witnesses
C. F. Kilgore
Harry Kilgore
Inventors
William W Vader
Albert C Cross
By their Attorney
Jas. F. Williamson

UNITED STATES PATENT OFFICE.

WILLIAM W. VADER AND ALBERT C. CROSS, OF MINNEAPOLIS, MINNESOTA.

HITCHING DEVICE.

SPECIFICATION forming part of Letters Patent No. 623,226, dated April 18, 1899.

Application filed April 23, 1898. Serial No. 678,562. (No model.)

*To all whom it may concern:*

Be it known that we, WILLIAM W. VADER and ALBERT C. CROSS, citizens of the United States, residing at Minneapolis, in the county of Hennepin and State of Minnesota, have invented certain new and useful Improvements in Hitching Devices; and we do hereby declare the following to be a full, clear, and exact description of the invention, such as will enable others skilled in the art to which it appertains to make and use the same.

Our invention has for its object to provide an improved hitching device for horses and other animals.

To this end our invention consists of the novel devices and combinations of devices hereinafter described, and defined in the claims.

The invention is illustrated in the accompanying drawings, wherein like notations refer to like parts throughout the several views.

Figure 1 is a perspective view of the keeper-block detached, which forms one of the two principal elements of our hitching device. Fig. 2 is a similar view of the hook or other element carried by the end of the strap. Fig. 3 is a similar view of a collar which is used on the strap for coöperation with the other elements when the strap is applied to the neck of the animal. Fig. 4 is a central longitudinal section through the keeper-block shown in Fig. 1. Fig. 5 is a perspective view showing a strap equipped with a double hitch, one for the neck of the animal and the other for hitching the animal to a post or other object. Fig. 6 is a side elevation showing the device as it would appear for a post-hitch, as in Fig. 5. Fig. 7 is a perspective view of the device as it would appear for a ring-hitch. Fig. 8 is a view in side elevation, showing the same parts as in Fig. 7 on an enlarged scale. Fig. 9 is a longitudinal vertical section through a keeper-block having a slightly-modified form of tension device, and Fig. 10 is a perspective view showing the device of the form suitable for application to a rope and for a neck-hitch.

At least one end of the strap 1 or the rope 2 is provided with a hook 3. On the strap or rope is also mounted for sliding adjustment thereon a keeper-block 4. This keeper-block 4 is provided with a suitable passage $a$ for the strap or rope, and if a strap is employed there is also located in the passage $a$ a suitable tension device, which may be in the form of a roller $b$, fitted with an adjusting eccentric $b'$, as shown in the main views, or it may be in the form of a simple cross-rod $c$, as shown in Fig. 9. In the form of tension device shown in the main views the eccentric or adjusting action on the roller $b$ is secured by the flattened shank of the set-screw $b'$, the head of which is available at the outside of the keeper for securing the required adjustment. The set-screw $b'$ is riveted to the side of the keeper-block 4, so as to turn with sufficient friction to remain wherever set. In virtue of this relation of the keeper-block 4 to the strap or the rope it of course may be adjusted to any desired point thereon. This keeper-block is also constructed to receive the tip or tips of the hook 3 in one position and to interlock therewith in another position of the said parts relative to each other. As shown, the hook 3 is a double hook, or has facing inturned ends $d$. The keeper-block 4 is correspondingly reduced at its central portion to afford vertical sections $f$ of guideways or channels adapted to receive the said hook-tips $b$ and direct the same to corresponding horizontal sections $f'$ of said guideways, which in turn are intercepted at their outer ends by short vertical sections $f^2$, which tap short hook-seats $f^3$ above the horizontal guideways or sections $f'$. The central or reduced portion $h$ of said keeper-block 4 is of a size to pass the tips $d$ of the hook 3, and the space between the hook-tips $b$ and the crown of the double hook is sufficient to permit the hook to be turned sufficiently far to allow the hook-tips to be drawn outward lengthwise of the guide-sections $f'$ and be raised into the hook-seats $f^3$. In the horizontal sections $f'$ of said guideways are located a pair of flat springs $k$, with their inner ends fixed to the floor of said guideways and their outer or spring ends working directly under the guide-sections $f^2$. Hence the hook 3 when pulled into position will be upheld by the springs $k$, so as to keep the hook-tips $d$ in the hook-seats $f^3$. In virtue of this construction and disposition of the parts the said hitching device is applicable equally well either for a post or a ring hitch. In the post-hitch, for example, as illustrated in Figs. 5 and 6, the hook will pull against the outer end of the hook-seats $f^3$, and in the case of the ring-hitch, as shown in Figs. 7 and 8, the ring material being less in diameter than the length of the sliding block 4, the hook-tips will pull against the rear ends of said hook-seats $f^3$. In the latter instance if the parts become slack, as might very readily happen, the hook would be prevented from falling down into the horizontal or bottom guide-sections $f'$ by the springs $k$, thereby insuring the security of the hitch. The spring $k$ will also secure the same result in the instance of the post-hitch, but are not especially needed for that purpose, because in virtue of the direction of the strain on the hook the hitch would be secure even if the hook did fall down to the lower or horizontal sections of the guideways $f'$.

When the device is used for a neck-hitch, a collar 5 is applied to the strap and a similar collar 6 is applied to a rope. The collar 5 is provided with a tongue $p$, adapted to engage with a hole in the strap to hold the same wherever set. The rope collar 6 is provided with a set-screw $p'$, adapted to be screwed into the rope for serving the like purpose. When these collars are properly set and the hitch is applied to the neck of the animal, the collar serves as a stop to limit the draw on the neck of the animal. Hence the animal cannot be choked.

In Fig. 5 the numeral 7 represents a post or other upright fixed object to which a hitch may be made.

In Figs. 7 and 8 the numerals 8 and 9 represent, respectively, a ring and staple made fast to a post 7 or other object.

From the foregoing description it will be seen that the hitching device herein disclosed meets the conditions of every form of required hitch. It is also strong, simple, and cheap to make. It will of course be understood that it may be of any suitable material and that the details might be varied or the relative forms of the coöperating devices be varied without departing from the spirit of our invention.

What we claim, and desire to secure by Letters Patent of the United States, is as follows:

1. A hitching device comprising a strap or rope, a hook secured to one end of said strap or rope, and a keeper-block adjustable on said strap or rope, which keeper-block is formed with hook-seats extended lengthwise of said block, and with guideways leading to the intermediate portions of said hook-seats, whereby said hook may be interlocked with said hook-seats by strains tending to draw it toward either end of said block, substantially as described.

2. A hitching device comprising a strap or rope, a hook secured to one end of said strap or rope and provided with inturned ends, and a keeper-block adjustable on said strap or rope, which keeper-block is formed in its sides with longitudinally-extended hook-seats and with transversely-extended guideways leading to the intermediate portions of said hook-seats, whereby the inturned ends of said hook may be interlocked with said hook-seats by strains tending to draw them toward either end of said block, substantially as described.

3. In a hitching device, the combination with a double or two-tip hook 3 secured to the end of the strap or rope, of a keeper-block 4 adjustable on the strap and provided with the guide-sections $f\ f'\ f^2\ f^3$ related to each other as described, and affording the projecting surfaces $f^4$ at the intersection of the sections $f'\ f^2$ and $f^3$, substantially as and for the purposes set forth.

4. In a hitching device, the combination with a double or two-tip hook 3, secured to the end of a strap or rope, of the keeper-block 4 adjustable on the strap or rope, which block is provided with the guide-sections $f\ f'\ f^2$ and $f^3$ related to each other as described, and affording the projecting surfaces $f^4$ at the junction of said sections $f'\ f^2$ and $f^3$, and the retaining-springs $k$ applied to hold the hook in working position, substantially as and for the purposes set forth.

5. In a hitching device, the combination with a strap or rope and a hook secured to one end of said strap or rope, of a keeper-block adjustable on said strap or rope and recessed to afford seats or guideways with which said hook may be interlocked, the said block being provided with an adjustable friction device for setting said block under a variable slipping friction on said strap or rope, substantially as described.

6. In a hitching device, the combination with a strap or rope, having a hook at one end, of an adjustable keeper-block on said strap or rope, provided with an adjustable friction device for engagement with said strap or rope, comprising a roller, and an eccentric or flat-sided screw-shank on which said roller is mounted in the passage for said strap or rope, with said screw securable in any desired position by friction, substantially as described.

In testimony whereof we affix our signatures in presence of two witnesses.

WILLIAM W. VADER.
ALBERT C. CROSS.

Witnesses:
JAS. F. WILLIAMSON,
B. B. NELSON.